Dec. 29, 1964    G. GLASER ETAL    3,163,787
DRIVING MECHANISM FOR THE MOVEMENT
REGULATOR OF AN ELECTRIC CLOCK
Filed Dec. 13, 1960    3 Sheets-Sheet 1

INVENTORS
Gunther Glaser
Fritz Herr

BY *Watson, Cole, Grindle & Watson*
ATTORNEYS

Dec. 29, 1964    G. GLASER ETAL    3,163,787
DRIVING MECHANISM FOR THE MOVEMENT
REGULATOR OF AN ELECTRIC CLOCK
Filed Dec. 13, 1960    3 Sheets-Sheet 2
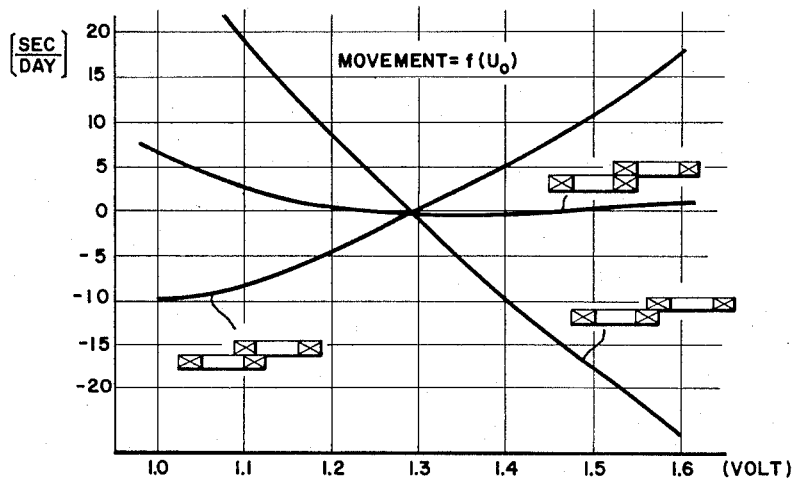
FIG. 5 $\begin{matrix}a\\b\end{matrix}$
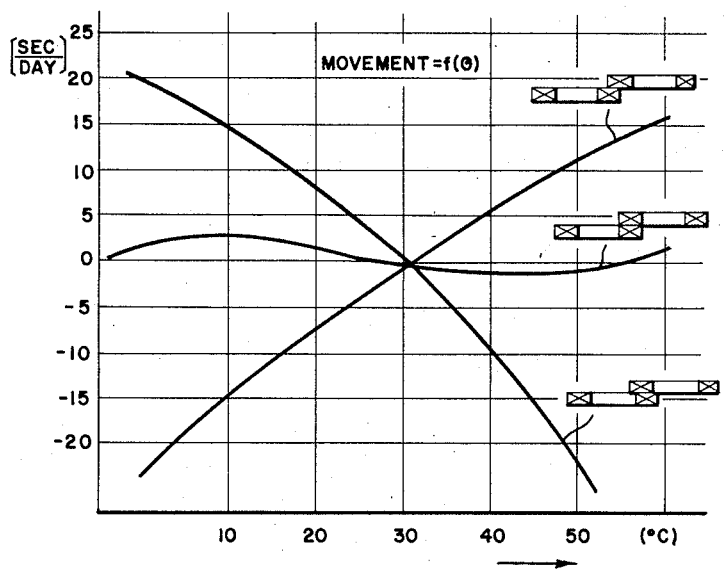
INVENTORS
Gunther Glaser
Fritz Herr
BY *Watson, Cole, Grindle & Watson*
ATTORNEYS Dec. 29, 1964  G. GLASER ETAL  3,163,787
DRIVING MECHANISM FOR THE MOVEMENT
REGULATOR OF AN ELECTRIC CLOCK
Filed Dec. 13, 1960  3 Sheets-Sheet 3
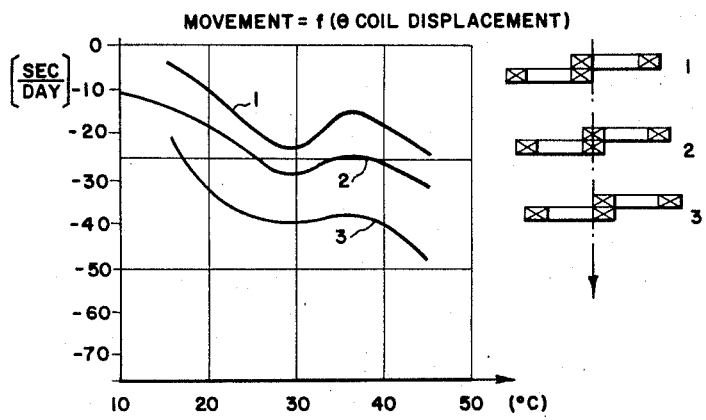
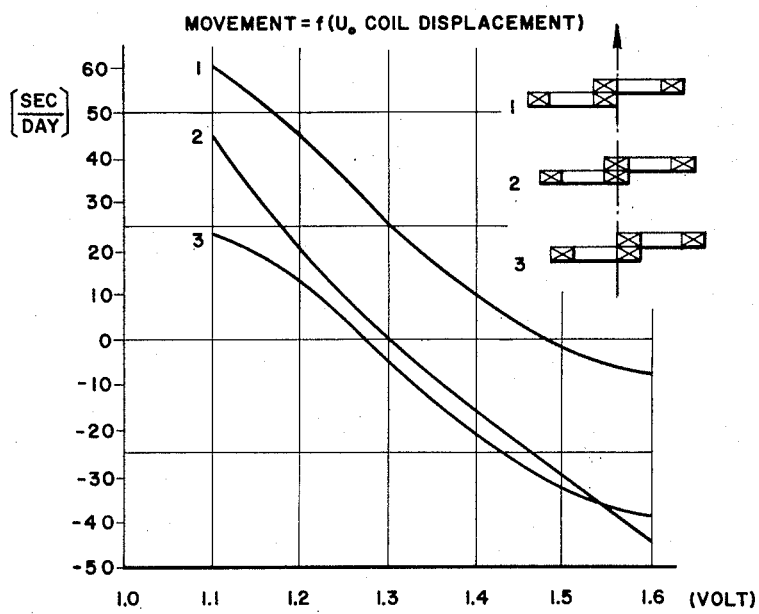
FIG.6 a/b
INVENTORS
Gunther Glaser
Fritz Herr
BY *Watson, Cole, Grindle & Watson*
ATTORNEYS 3,163,787
DRIVING MECHANISM FOR THE MOVEMENT
REGULATOR OF AN ELECTRIC CLOCK
Günther Glaser, Parzelle Buhle 5, and Fritz Herr, Kolpingstrasse 18, both of Schramberg, Wurttemberg, Germany
Filed Dec. 13, 1960, Ser. No. 75,599
Claims priority, application Germany Dec. 15, 1959
5 Claims. (Cl. 310—38)

The invention relates to a driving mechanism for the movement regulator of an electric clock, preferably wherein the movement regulator comprises a pendulum, with an electronic amplifier, particularly a transistor amplifier, comprising a control coil and a driving coil and a permanent magnet system swinging past the stationary coils and only one path of flux passing through the coils.

Contactless operating driving mechanisms for pendulum clocks are known, in which an elongated permanent magnet arranged perpendicularly to the axis of the pendulum plunges during its swinging movement into a coil system. Such driving mechanisms require extremely accurate adjustment of the pendulum if contact of the pendulum magnet with the coils is to be avoided. Moreover, such driving mechanisms are of relatively large dimensions.

A driving mechanism for a pendulum is likewise known in which the pendulum carries a permanent magnet magnetized in the direction of the pendulum axis and swings past a coil system. This known arrangement certainly overcomes the objection of a magnet swinging into a coil system but possesses several disadvantages.

Such prior art devices together with typical transistor driving means which are in standard use and can be used to drive the coils of the present invention are shown in French Patent 1,090,564, issued March 31, 1955.

For example, when two juxtaposed coils are used in a coil system, the leads of the active coil sides are not simultaneously subjected to the magnetic flux of the permanent magnet. If in such an arrangement the permanent magnet swings with its longitudinal axis past the active leads of the control coil, the potential impulse induced therein attains its maximum and likewise the driving current controlled by this potential impulse in the driving coil. This current, however, can exert a considerably weaker driving impulse on the magnet because the lines of force emanating from the magnet pass through the driving coil only to a lesser extent. If, on the other hand, the magnet swings with its axis past the effective leads of the driving coil, the flux of force passing through these leads certainly attains its maximum but the driving current impulse has already far exceeded its maximum. Therefore, the point of concentration of the driving current impulse does not coincide with the maximum magnetic flux passing through the effective leads of the driving coil. Consequently the working force $K=Bil$ acting on the magnet remains small because the derivative trend with respect to time of the induction $B$ as well as of the coil current $i$ is out of phase in time owing to the geometrical arrangement of the coils with inductance $l$. As a result, the degree of efficiency of the driving mechanism becomes unfavourable on the one hand, while on the other hand the driving impulse occurs outside the zero position of the pendulum, namely to a certain extent dependent upon the amplitude of swing, which has an unfavourable effect on the isochronism of the swinging of the pendulum.

Furthermore a coil system is known, in which the control coil and the driving coil are arranged concentrically, whereby their common axis coincides with the longitudinal axis of the permanent magnet when the pendulum is at rest. This coil system is also open to the objection that the driving current cannot exert its full effect on the magnet because the longitudinal axis thereof is located outside the driving coil when the driving current is at its maximum. Moreover, the driving impulse in this case takes place far outside the zero position of the pendulum and consequently only after a certain amplitude of oscillation has been surpassed. These objections make the acceleration of the pendulum more difficult and, experience has shown, have a detrimental effect on the movement. In the case of coaxially superposed coils, the superposed leads of the effective sides of the coils are certainly subjected to the flux of force of the permanent magnets at the same time, but here also the working impulse occurs far outside the zero position of the pendulum. This, as already mentioned, results in the disadvantage of difficult acceleration and unfavourable influencing of the duration of swing.

Finally, a pendulum movement regulator is known in which two parallel permanent magnets in the zero position of the pendulum act on the coil sides of the coaxially arranged coils. In this case, however, driving impulses occur outside the zero position, namely when the magnet influencing one pair of sides of the coils in the zero position of the movement regulator influences the other pair of parallel coil sides in the course of its oscillation.

The object of the invention is to produce a driving mechanism for the movement regulator of an electric clock in which the above-mentioned objections are avoided. According to the invention the coils are arranged one behind the other in the effective range of the magnet system with only one side of each coil in the direction of the magnetic flux, in such a manner that these two sides of the coils are simultaneously in the path of the magnetic flux in known manner when the movement regulator is in the zero position. Thereby the side of the driving coil is preferably in the direct proximity of the magnet. In the arrangement according to the invention, the lines of force of the permanent magnet therefore pass through both coil sides simultaneously so that the maximum driving current in the driving coil coincides with the maximum induction, namely in the zero position of the movement regulator. This results in a high degree of efficiency of the arrangement, an extremely easy acceleration, simple correction of variation in temperature as well as simple amplitude stabilization.

The invention is hereinafter described in greater detail with the aid of several embodiments illustrated by way of example in the accompanying drawings, in which:

FIGS. 5a and 5b are two diagrams illustrating the dependence upon temperature and potential, taking into consideration the mutual position of the coils; and FIGS. 6a and 6b show the dependence upon temperature and potential, taking into consideration the common position of the effective sides of the coils in relation to the zero position of the pendulum.

Figure 1:
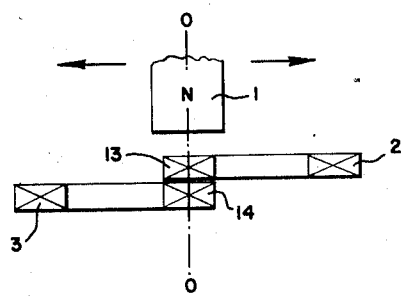
FIGS. 1 to 3 are diagrammatic views of an arrangement in which the coils are mutually displaced in the direction of movement of the movement regulator, FIGS. 1 and 2 each being a side view in section and FIG. 3 a top plan view of the coils.
Figure 2:
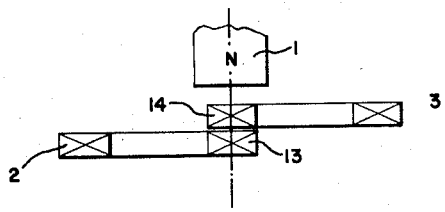

The permanent magnet carried by the movement regulator and acting on the coils is designated by 1. It is a magnet fixed on the lower end of the pendulum having a pole face mounted to swing in an arc. Arranged adjacent the magnet arc are a driving coil 2 and a control coil 3, the active sides 13 and 14 of which are superposed in the zero position of the magnet where the magnetic field extends axially from the pole face to cut the coils transversely. The width of the coil sides 13 and 14 in the direction of the pendulum movement (arrow)

is about the same as the width of the magnet in this direction. In the zero position of the magnet all the lines of force passing through the side 14 of the control coil also pass simultaneously through the overlapped side 13 of the driving coil, so that a maximum driving effect takes place at the most favourable point of the swing when the pendulum is axially aligned with the latter coil sides. In the case of very great amplitude, although a control potential can also be induced in the outer coil side of the control coil 12, yet the driving current produced by this control potential has no effect on the magnet, because the driving coil is not in the path of the magnetic flux and consequently can exert no energy effect on the magnet.

Figure 4:
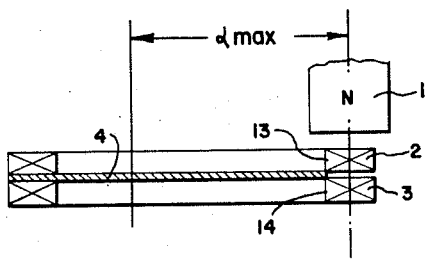
FIG. 4 shows an arrangement in which the coils are arranged coaxially with a damping disc between them.

In FIG. 4 the control coil 3 and the driving coil 2 are arranged coaxially superposed. The coil sides 13 and 14 here also lie in the zero position of the pendulum. The space between the sides 13 and 14 is also in the zero position of the pendulum. The space between the opposite sides of the two coils is chosen so large that the coil sides are not influenced by the magnet 1 at maximum amplitude of swing of the pendulum. The two coils 2 and 3 can be coupled so closely together that reaction oscillations occur especially when a slight potential exciting the reaction oscillation is present on the basis of a transistor arrangement containing the coils. In this manner reliable automatic starting up with sharp initiation of impulse with complete modulation of the driving current can be obtained. The degree of coupling between the two coils 2 and 3 can be influenced in known manner by the damping disc 4. This damping or attenuation disc 4 is fixed between the coils and is apertured in the vicinity of the magnet in a configuration related to the amplitude of the magnet 1.

Figure 3:
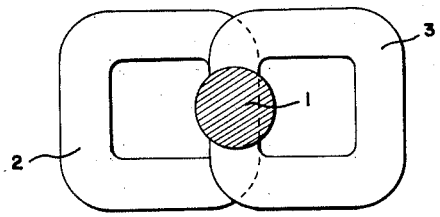

In all arrangements of the coils it is advantageous to make the coil sides 13 and 14 perpendicular to the pendulum movement relatively long so that the action of the magnet on the coils is perpendicular to the plane of swing, as far as possible independently of the inclination of the pendulum. (See FIG. 3.) This can also be accomplished by bending the coils away from the magnets so that the remote sides are at angles with the axis of the magnetic system.

By the relative displacement of the coils 2 and 3 in the direction of the magnet movement, it is possible to influence the dependence upon temperature and also the dependence upon potential of the movement regulator. FIGS. 5a and 5b are diagrams in which the dependence of the movement upon the potential and temperature are shown. The position of the two coils in relation to each other is indicated for each curve.

Also the joint displacement of the two coils in relation to the zero position of the pendulum causes a change in the dependence of the movement regulator oscillation upon temperature as well as upon potential. These dependencies are shown in FIGS. 6a and 6b, the position of the coils being again indicated for each curve.

The drawings show the driving mechanism according to the invention for a pendulum clock, but the invention is not restricted to pendulum clocks but can also be employed for other movement regulator systems, for example in a balance wheel carrying a cylindrical magnet magnetized in the direction of the axis of rotation.

We claim:

1. A driving mechanism for the movement regulator of an electric clock without moving electrical contacts, comprising an air core control coil, an air core driving coil, said movement regulator comprising a permanent magnet pendulum, having a pole face, mounted to swing in an arc adjacent the coils and creating a magnetic field extending axially from the pole face, the magnetic field cutting the coils transverse thereto, said coils each having two coil sides arranged transverse to the swinging path of the pendulum, a first coil side of each coil overlapping within the swinging arc of the pendulum such that the magnetic flux passes through the overlapped coil sides of the two coils simultaneously when the pendulum is axially aligned with the latter coil sides, the second coil sides of each coil positioned such that the coil sides are beyond the influence of the magnetic field created by the magnetic flux.

2. A driving mechanism according to claim 1, wherein the driving coil is nearer the pendulum than the control coil when the pendulum is in said aligned position.

3. A driving mechanism according to claim 1, wherein the coils are mutually displaced in the direction of the movement of the pendulum, and wherein said second coil sides are located at both sides of the overlapped coil sides.

4. Driving mechanism according to claim 1, wherein said coils are of the same size and are arranged coaxial with one pair of coil sides in the aligned position of the pendulum.

5. Driving mechanism according to claim 4, wherein a damping disc is arranged between the coils.

References Cited in the file of this patent

UNITED STATES PATENTS

| | | |
|---|---|---|
| 2,843,742 | Cluwen | July 15, 1958 |
| 2,949,583 | Sargeant | Aug. 16, 1960 |

FOREIGN PATENTS

| | | |
|---|---|---|
| 1,090,564 | France | Oct. 20, 1954 |